United States Patent
Deng et al.

(10) Patent No.: US 10,921,626 B2
(45) Date of Patent: Feb. 16, 2021

(54) DISPLAY PANEL MOTHERBOARD, AND METHOD FOR MANUFACTURING DISPLAY PANEL

(71) Applicants: BOE TECHNOLOGY GROUP CO., LTD., Beijing (CN); CHENGDU BOE OPTOELECTRONICS TECHNOLOGY CO., LTD., Sichuan Province (CN)

(72) Inventors: Tao Deng, Beijing (CN); Xi Xiang, Beijing (CN); Junneng Deng, Beijing (CN); Yuhuan Feng, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 518 days.

(21) Appl. No.: 15/785,506

(22) Filed: Oct. 17, 2017

(65) Prior Publication Data
US 2018/0257974 A1 Sep. 13, 2018

(30) Foreign Application Priority Data
Mar. 9, 2017 (CN) .......................... 2017 1 0137894

(51) Int. Cl.
*G02F 1/1333* (2006.01)
*G02F 1/1339* (2006.01)
(Continued)

(52) U.S. Cl.
CPC .... *G02F 1/133351* (2013.01); *G02F 1/13392* (2013.01); *B26D 7/00* (2013.01);
(Continued)

(58) Field of Classification Search
CPC ............ G02F 1/133351; G02F 1/1339; G02F 1/13392; G02F 1/13394; G02F 1/133377; G02F 2001/13396
See application file for complete search history.

(56) References Cited

U.S. PATENT DOCUMENTS 10,133,113 B2 * 11/2018 Ishikawa ........... G02F 1/133512
2010/0045921 A1 * 2/2010 Wang ................ G02F 1/133351
349/153
(Continued)

FOREIGN PATENT DOCUMENTS

| CN | 202600314 U | 12/2012 |
|----|-------------|---------|
| CN | 104460121 A | 3/2015 |
| CN | 104834143 A | 8/2015 |

OTHER PUBLICATIONS

First Office Action for Chinese Application No. 201710137894.2, dated Apr. 23, 2019, 9 Pages.

*Primary Examiner* — Dung T Nguyen
(74) *Attorney, Agent, or Firm* — Brooks Kushman P.C.

(57) ABSTRACT

The present disclosure provides a display panel motherboard, including a first substrate and a second substrate arranged opposite to each other to form a cell. A display region and a non-display region surrounding the display region are provided at the first substrate and the second substrate. At the non-display region of the first substrate, a first spacer and a second spacer are arranged sequentially in a direction away from the display region of the first substrate. A vertical distance d1 between an end surface of the first spacer adjacent to the second substrate and a surface of the second substrate adjacent to the first substrate is equal to a vertical distance d2 between an end surface of the second spacer adjacent to the second substrate and the surface of the second substrate adjacent to the first substrate.

15 Claims, 4 Drawing Sheets

(51) Int. Cl.
 *B26D 7/00* (2006.01)
 *C03B 33/023* (2006.01)
 *C03B 33/07* (2006.01)
 *C03B 33/033* (2006.01)
 *G02F 1/1345* (2006.01)

(52) U.S. Cl.
 CPC .......... *C03B 33/023* (2013.01); *C03B 33/033* (2013.01); *C03B 33/07* (2013.01); *G02F 1/1339* (2013.01); *G02F 1/1345* (2013.01); *G02F 1/133377* (2013.01); *G02F 2001/133388* (2013.01)

(56) References Cited

U.S. PATENT DOCUMENTS

2016/0070127 A1\* 3/2016 Ishikawa ............... G02F 1/1368
 349/42
2016/0357056 A1 12/2016 Kang
2019/0121185 A1\* 4/2019 Liu ................... G02F 1/133514

\* cited by examiner

DISPLAY PANEL MOTHERBOARD, AND METHOD FOR MANUFACTURING DISPLAY PANEL

CROSS-REFERENCE TO RELATED APPLICATION

This application claims priority to Chinese Patent Application No. 201710137894.2 filed on Mar. 9, 2017, which is incorporated herein by reference in its entirety.

TECHNICAL FIELD

The present disclosure relates to the field of display technology, in particular to a display panel motherboard and a method for manufacturing a display panel.

BACKGROUND

Along with the growth in the living standard, a vehicle has almost become a must-have item for each family and the demand for on-board display screens increases year by year. Depending on its position, the on-board display screen includes a central control display screen, a rearview mirror display screen, an instrument board display screen, etc. As the display screen for the vehicle, both the thermal resistance and the shock resistance are highly demanded.

Usually, for collision and vibration avoidance, the on-board display screen has a thicker glass substrate. In a conventional mode, a high-permeability cutter wheel needs to be used for cutting the thicker glass substrate at a large cutting pressure.

However, due to this cutting method, in the case of cutting a display panel motherboard to form the display panel, an uneven support force may be applied to a to-be-cut substrate, and thereby cracks may occur.

SUMMARY

In one aspect, the present disclosure provides in some embodiments a display panel motherboard, including a first substrate and a second substrate arranged opposite to each other to form a cell. A display region and a non-display region surrounding the display region are provided at the first substrate and the second substrate. At the non-display region of the first substrate, a first spacer and a second spacer are arranged sequentially in a direction away from the display region of the first substrate. A vertical distance d1 between an end surface of the first spacer adjacent to the second substrate and a surface of the second substrate adjacent to the first substrate is equal to a vertical distance d2 between an end surface of the second spacer adjacent to the second substrate and the surface of the second substrate adjacent to the first substrate, so that a pressure applied to a portion of the first substrate at a position corresponding to the first spacer is identical to a pressured applied to a portion of the first substrate at a position corresponding to the second spacer in the case of cutting the display panel motherboard to form a display panel.

In a possible embodiment of the present disclosure, each of d1 and d2 is greater than zero.

In a possible embodiment of the present disclosure, each of d1 and d2 is equal to zero.

In a possible embodiment of the present disclosure, a height of the first spacer is greater than a height of the second spacer.

In a possible embodiment of the present disclosure, the first substrate includes a color resin pattern at a side adjacent to the second substrate, and the color resin pattern is provided with a first slot in which a portion of the second spacer is located.

In a possible embodiment of the present disclosure, the height of the first spacer is equal to the height of the second spacer.

In a possible embodiment of the present disclosure, the first substrate includes a black matrix pattern at a side adjacent to the second substrate, and the black matrix pattern is provided with a second slot at a position corresponding to the second spacer.

In a possible embodiment of the present disclosure, the height of the first spacer is equal to the height of the second spacer.

In a possible embodiment of the present disclosure, a cutting region is arranged between the display region and the non-display region, and the second substrate is provided with a protection pattern at a position corresponding to the cutting region of the first substrate.

In a possible embodiment of the present disclosure, the protection pattern includes at least one of a first sealant, a conductive layer, an alignment layer and a spacer.

In a possible embodiment of the present disclosure, a second sealant for sealing the cell is provided at the display region, and in the case that the protection pattern includes the first sealant, a thickness of the first sealant is smaller than or equal to a thickness of the second sealant.

In a possible embodiment of the present disclosure, in the case that the protection pattern includes the conductive layer, the conductive layer is made of indium tin oxide (ITO).

In another aspect, the present disclosure provides in some embodiments a method for manufacturing a display panel, including steps of: forming the above-mentioned display panel motherboard; and cutting the display panel motherboard so as to form the display panel.

In a possible embodiment of the present disclosure, the step of forming the display panel motherboard includes: forming a first substrate; forming a second substrate; enabling the first substrate to be arranged opposite to the second substrate to form a cell, so as to form the display panel motherboard. The step of forming the first substrate includes: depositing a black matrix material onto a first base substrate, and forming a black matrix pattern through exposing, developing and etching; depositing a color resin material onto the black matrix pattern, and forming a color resin pattern through exposing, developing and etching; and forming a first spacer and a second spacer sequentially on the color resin pattern in a direction away from a display region. A vertical distance d1 between an end surface of the first spacer adjacent to the second substrate and a surface of the second substrate adjacent to the first substrate is equal to a vertical distance d2 between an end surface of the second spacer adjacent to the second substrate and the surface of the second substrate adjacent to the first substrate, and a height of the first spacer is greater than a height of the second spacer.

In a possible embodiment of the present disclosure, the step of forming the display panel motherboard includes: forming a first substrate; forming a second substrate; and enabling the first substrate to be arranged opposite to the second substrate to form a cell, so as to form the display panel motherboard. The step of forming the first substrate includes: depositing a black matrix material onto a first base substrate, and forming a black matrix pattern through exposing, developing and etching; depositing a color resin material onto the black matrix pattern, and forming a color resin pattern comprising a first slot through exposing, developing and etching; and forming a first spacer on the color resin pattern at a position adjacent to a display region, and forming a second spacer in the first slot, so as to from the first substrate.

In a possible embodiment of the present disclosure, the step of forming the display panel motherboard includes: forming a first substrate; forming a second substrate; and enabling the first substrate to be arranged opposite to the second substrate to form a cell, so as to form the display panel motherboard. The step of forming the first substrate includes: depositing a black matrix material onto a first base substrate, and forming a black matrix pattern comprising a second slot through exposing, developing and etching; depositing a color resin material onto the black matrix pattern, and forming a color resin pattern through exposing, developing and etching; and forming a first spacer on the color resin pattern at a position adjacent to a display region, and forming a second spacer at a position corresponding to the second slot, so as to from the first substrate.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the embodiments of the present disclosure, the term "display panel motherboard" refers to a prefabricated panel which has not been cut yet before the formation of a display panel. The display panel motherboard is cut so as to remove a non-display region for a pattern generation test, thereby to form the so-called display panel.

Figure 1:
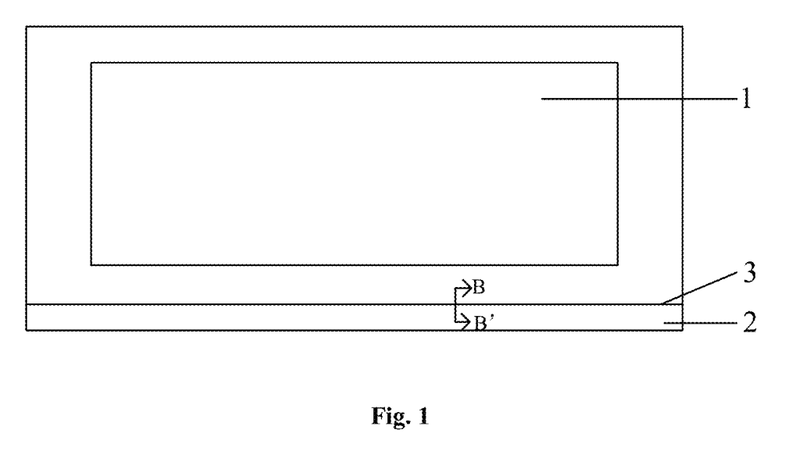
FIG. 1 is a schematic view showing a display panel motherboard.

As shown in FIG. 1, a display panel motherboard is provided with a display region 1, a non-display region 2 surrounding the display region, and a cutting region arranged between the display region 1 and the non-display region 2. In the case of cutting the display panel motherboard to form a display panel, a cutting operation is performed at the cutting region 3. It should be appreciated that, the display region refers to a region corresponding to the display panel, and the non-display region refers to a region between adjacent display panels, i.e., beyond the display region.

Figure 2:
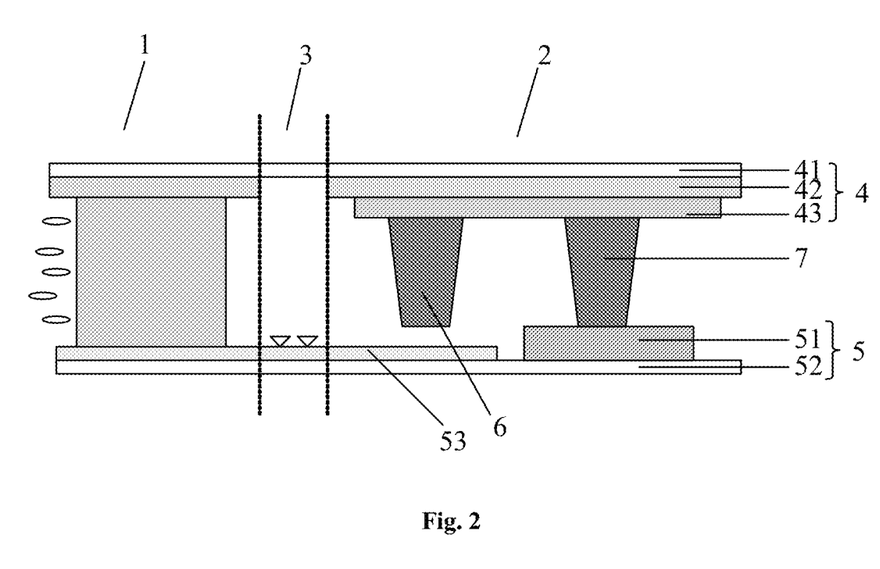
FIG. 2 is a sectional view of the display panel motherboard in FIG. 1 along line BB'.

As shown in FIG. 2, the display panel motherboard includes a first substrate 1 and a second substrate 5 arranged opposite to each other to form a cell. The first substrate 4 includes a first base substrate 41, a black matrix pattern 42 and a color resin pattern 43. The second substrate 5 includes a switch 51, a second base substrate 52 and an active circuit 53. At an electrode edge (i.e., an edge to which an electric signal is applied, e.g., an edge to which a Gate on Array (GOA) circuit is connected, or an edge to which a chip is connected), usually display line connections and the switch 51 are arranged at the non-display region 2, so as to perform pattern generation test for the display panel. A first spacer 6 and a second spacer 7 are further arranged on the first substrate 4. An end surface of the first spacer 6 adjacent to the second substrate 5 corresponds to the active circuit 53, and an end surface of the second spacer 7 adjacent to the second substrate 5 corresponds to the switch 51. A height of the first spacer 6 is identical to a height of the second spacer 7. However, because a thickness of the switch 51 is greater than a thickness of the active circuit 53, there is a certain vertical distance between the end surface of the first spacer 6 adjacent to the second substrate 5 and a surface of the second substrate adjacent to the first substrate, while there is no distance between the end surface of the second spacer 7 adjacent to the second substrate 5 and the surface of the second substrate adjacent to the first substrate, i.e., the end surface of the second spacer 7 adjacent to the second substrate 5 is in direct contact with the surface of the second substrate adjacent to the first substrate so as to function as a support. Here, the vertical distance refers to a distance in a direction vertical to the base substrate. In the case of cutting the display panel motherboard, a pressure applied to a portion of the first substrate 4 at a position corresponding to the first spacer 6 is different from a pressure applied to a portion of the first substrate 4 at a position corresponding to the second spacer 7, i.e., an uneven force is applied to the first substrate 4. At this time, the first substrate 4 may be depressed at the cutting region 3, resulting in severe cracks and more debris. In a subsequent process, a data line or a gate line may be scratched by the debris, and thereby defective lines may occur.

In order to solve this problem, the switch 51 is moved to be at a non-electrode edge by some manufacturers, so as to eliminate a segment gap of the second substrate at the non-display region 2 due to the existence of the first spacer 6 and the second spacer 7. However, at this time an undetected error may occur. To be specific, a direction in which a check signal is inputted by the switch is opposite to a direction in which a signal is inputted by an integrated circuit (IC), so scratches at the non-display region 2 may not be detected.

Figure 3:
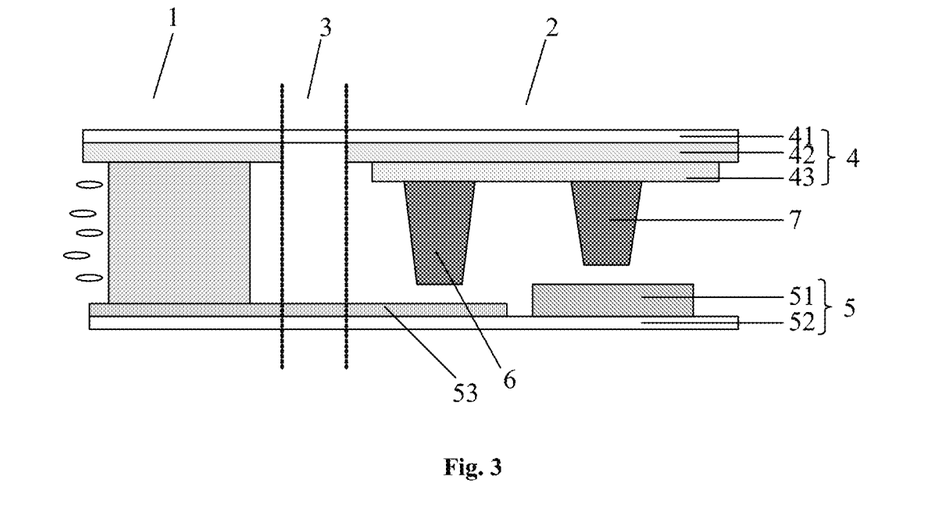
FIG. 3 is a schematic view showing a display panel motherboard according to one embodiment of the present disclosure.

Referring to FIG. 3, the present disclosure provides in some embodiments a display panel motherboard, which includes a first substrate 4 and a second substrate 5 arranged opposite to the first substrate 4 to form a cell. A display region 1 and a non-display region 2 surrounding the display region 1 are provided at the first substrate 4 and the second substrate 5. At the non-display region 2 of the first substrate 4, a first spacer 6 and a second spacer 7 are arranged sequentially in a direction away from the display region 2 of the first substrate 4. A vertical distance d1 between an end surface of the first spacer 6 adjacent to the second substrate 5 and a surface of the second substrate 5 adjacent to the first substrate 4 is equal to a vertical distance d2 between an end surface of the second spacer 7 adjacent to the second substrate 5 and the surface of the second substrate 5 adjacent to the first substrate 4. In this way, in the case of cutting the display panel motherboard to form a display panel, a pressure applied to a portion of the first substrate 4 at a position corresponding to the first spacer 6 is identical to a pressured applied to a portion of the first substrate 4 at a position corresponding to the second spacer 7, i.e., an even force is applied to the first substrate 4.

In the embodiments of the present disclosure, since the vertical distance d1 between the end surface of the first spacer 6 adjacent to the second substrate 5 and the surface of the second substrate 5 adjacent to the first substrate 4 is equal to the vertical distance d2 between the end surface of the second spacer 7 adjacent to the second substrate 5 and the surface of the second substrate 5 adjacent to the first substrate 4 (d1=d2), the pressure applied to the portion of the first substrate 4 at the position corresponding to the first spacer 6 may be identical to the pressure applied to the portion of the first substrate 4 at the position corresponding to the second spacer 7 in the case of cutting the display panel motherboard to form the display panel, i.e., an even force may be applied to the first substrate 4. As a result, it is able to prevent the occurrence of severe cracks.

In a possible embodiment of the present disclosure, d1 and d2 may each be greater than zero. In other words, the first spacer 6 and the second spacer 7 are each not in contact with the second substrate 5. At this time, after the first substrate 4 and the second substrate 5 are arranged opposite to each other to form the cell, neither of the first spacer 6 and the second spacer 7 functions as a support. Hence, in the case of cutting the display panel motherboard to form the display panel, the pressure applied to the portion of the first substrate 4 at the position corresponding to the first spacer 6 may be identical to the pressured applied to the portion of the first substrate 4 at the position corresponding to the second spacer 7, i.e., an even force is applied to the first substrate 4. As a result, it is able to prevent the occurrence of severe cracks.

Of course, considering an entire thickness of the display panel, the values of d1 and d2 may be set in accordance with the practical need, which will not be particularly defined herein.

In a possible embodiment of the present disclosure, a height of the first spacer 6 is greater than a height of the second spacer 7.

In other words, as compared with a situation where the height of the first spacer 6 is identical to the height of the second spacer 7, in the embodiments of the present disclosure, the height of the first spacer 6 may remain unchanged and meanwhile the height of the second spacer 7 may be reduced, so that the height of the first spacer 6 is greater than the height of the second spacer 7, thereby each of d1 and d2 is greater than zero. Of course, the first spacer 6 and the second spacer 7 may be formed using a half-tone mask through a single patterning process, without an additional manufacture process, which will not be particularly defined herein.

It should be appreciated that, the display panel motherboard may be provided in various forms. For example, the first spacer 6 and the second spacer 7 may also be provided on the second substrate, which will not be particularly defined herein.

According to the display panel motherboard in the embodiments of the present disclosure, the first spacer 6 and the second spacer 7 are arranged sequentially on the first substrate 4 in the direction away from the display region 2. The vertical distance d1 between the end surface of the first spacer 6 adjacent to the second substrate 5 and the surface of the second substrate 5 adjacent to the first substrate 4 is equal to the vertical distance d2 between the end surface of the second spacer 7 adjacent to the second substrate 5 and the surface of the second substrate 5 adjacent to the first substrate 4, so that the pressure applied to the portion of the first substrate 4 at the position corresponding to the first spacer 6 is identical to the pressured applied to the portion of the first substrate 4 at the position corresponding to the second spacer 7 in the case of cutting the display panel motherboard to form the display panel, i.e., an even force is applied to the first substrate 4. In this way, even in the case that a larger pressure is applied, it is still able for the first spacer and the second spacer to provide even and stable support, thereby to prevent the occurrence of severe cracks, reduce the quantity of debris, and prevent the occurrence of defective lines. In addition, it is also able to ensure the detection accuracy and prevent the occurrence of undetected errors.

Figure 4:
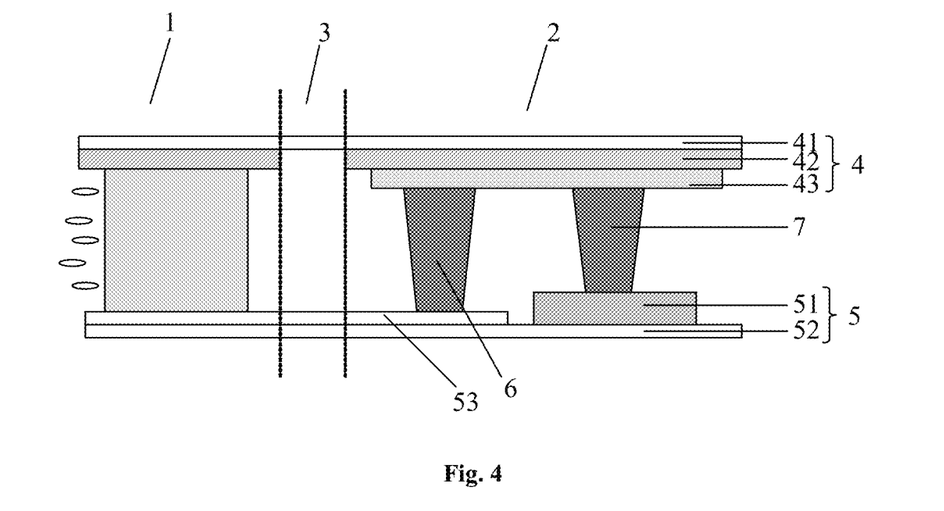
FIG. 4 is another schematic view showing the display panel motherboard according to one embodiment of the present disclosure.

With reference to FIG. 4, the present disclosure further provides in some embodiments a display panel motherboard having a structure similar to that of the above-mentioned display panel motherboard, with a difference in that each of d1 and d2 is equal to zero.

In the embodiments of the present disclosure, the height of the second spacer 7 remains unchanged, and the height of the first spacer 6 increases, so that the height of the first spacer 6 is greater than the height of the second spacer 7, and thereby each of d1 and d2 is equal to zero. Of course, the first spacer 6 and the second spacer 7 may be formed using a half-tone mask through a single patterning process, without an additional manufacture process, which will not be particularly defined herein.

In other words, in the embodiments of the present disclosure, both the first spacer 6 and the second spacer 7 are in contact with the second substrate 5, i.e., after the first substrate 4 is arranged opposite to the second substrate 5 to form the cell, each of the first spacer 6 and the second spacer 7 may function as a support. Hence, in the case of cutting the display panel motherboard to form the display panel, the pressure applied to the portion of the first substrate 4 at the position corresponding to the first spacer 6 may be identical to the pressured applied to the portion of the first substrate 4 at the position corresponding to the second spacer 7, i.e., an even force is applied to the first substrate 4. As a result, it is able to prevent the occurrence of severe cracks.

According to the display panel motherboard in the embodiments of the present disclosure, the first spacer 6 and the second spacer 7 are arranged sequentially on the first substrate 4 in the direction away from the display region 2. The vertical distance d1 between the end surface of the first spacer 6 adjacent to the second substrate 5 and the surface of the second substrate 5 adjacent to the first substrate 4 is equal to the vertical distance d2 between the end surface of the second spacer 7 adjacent to the second substrate 5 and the surface of the second substrate 5 adjacent to the first substrate 4, so that the pressure applied to the portion of the first substrate 4 at the position corresponding to the first spacer 6 is identical to the pressured applied to the portion of the first substrate 4 at the position corresponding to the second spacer 7 in the case of cutting the display panel motherboard to form the display panel, i.e., an even force is applied to the first substrate 4. In this way, even in the case that a larger pressure is applied, it is still able for the first spacer and the second spacer to provide even and stable support, thereby to prevent the occurrence of severe cracks, reduce the quantity of debris, and prevent the occurrence of defective lines. In addition, it is also able to ensure the detection accuracy and prevent the occurrence of undetected errors.

Figure 5:
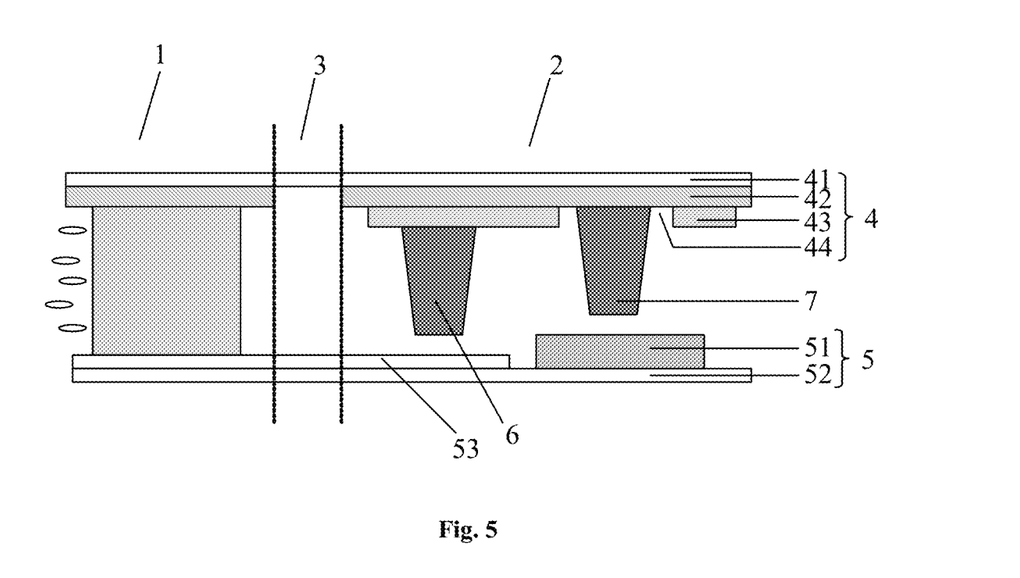
FIG. 5 is yet another schematic view showing the display panel motherboard according to one embodiment of the present disclosure.

With reference to FIG. 5, the present disclosure further provides in some embodiments a display panel motherboard having a structure similar to that of the above-mentioned display panel motherboard, with a difference in that the first substrate 4 includes a black matrix pattern 42 and a color resin pattern 43 at a side adjacent to the second substrate 5, and the color resin pattern 43 is provided with a first slot 44 in which a portion of the second spacer 7 is located.

It should be appreciated that, in the embodiments of the present disclosure, a depth of the first slot 44 is equal to a thickness of the color resin pattern 43. To be specific, the first substrate 4 may include the color resin pattern 43 with the first slot 44 at the side adjacent to the second substrate 5 (i.e., below the first base substrate 41 in FIG. 5). A portion of the second spacer 7 away from the second substrate 5 may be received in the first slot 44, i.e., an end surface of the second spacer 7 away from the second substrate 5 may be in contact with the black matrix pattern 42. A portion of the second spacer 7 is arranged inside the first substrate 4, and the other portion of the second spacer 7 is arranged between the first substrate 4 and the second substrate 5.

In a possible embodiment of the present disclosure, the height of the first spacer 6 is identical to the height of the second spacer 7.

To be specific, in the case that the portion of the second spacer 7 is arranged within the first slot 44, actually the second spacer 7 is moved upward. Hence, even in the case that the height of the first spacer 6 is identical to the height of the second spacer 7, there may still exist the vertical distance d2 between the end surface of the second spacer 7 adjacent to the second substrate 5 and an upper surface of the second substrate. At this time, neither of the first spacer 6 and the second spacer 7 is in contact with the second substrate 5, i.e., after the first substrate 4 is arranged opposite to the second substrate 5 to form the cell, neither of the first spacer 6 and the second spacer 7 may function as a support. Hence, in the case of cutting the display panel motherboard to form the display panel, the pressure applied to the portion of the first substrate 4 at the position corresponding to the first spacer 6 may be identical to the pressured applied to the portion of the first substrate 4 at the position corresponding to the second spacer 7, i.e., an even force is applied to the first substrate 4. As a result, it is able to prevent the occurrence of severe cracks.

It should be appreciated that, in the case that the second spacer 7 is moved upward by a distance equal to the vertical distance d1 between the end surface of the first spacer 6 adjacent to the second substrate 5 and the surface of the second substrate 5 adjacent to the first substrate 4, the vertical distance d1 between the end surface of the first spacer 6 adjacent to the second substrate 5 and the surface of the second substrate 5 adjacent to the first substrate 4 is equal to the vertical distance d2 between the end surface of the second spacer 7 adjacent to the second substrate 5 and the surface of the second substrate 5 adjacent to the first substrate 4.

Obviously, the display panel motherboard may be provided in various forms. For example, the depth of the first slot 44 may be less than the thickness of the color resin pattern 43 so that the end surface of the second spacer 7 away from the second substrate 5 may still be in contact with the lower surface of color resin pattern 43.

According to the display panel motherboard in the embodiments of the present disclosure, the first spacer 6 and the second spacer 7 are arranged sequentially on the first substrate 4 in the direction away from the display region 2. The vertical distance d1 between the end surface of the first spacer 6 adjacent to the second substrate 5 and the surface of the second substrate 5 adjacent to the first substrate 4 is equal to the vertical distance d2 between the end surface of the second spacer 7 adjacent to the second substrate 5 and the surface of the second substrate 5 adjacent to the first substrate 4, so that the pressure applied to the portion of the first substrate 4 at the position corresponding to the first spacer 6 is identical to the pressured applied to the portion of the first substrate 4 at the position corresponding to the second spacer 7 in the case of cutting the display panel motherboard to form the display panel, i.e., an even force is applied to the first substrate 4. In this way, even in the case that a larger pressure is applied, it is still able for the first spacer and the second spacer to provide even and stable support, thereby to prevent the occurrence of severe cracks, reduce the quantity of debris, and prevent the occurrence of defective lines. In addition, it is also able to ensure the detection accuracy and prevent the occurrence of undetected errors.

Figure 6:
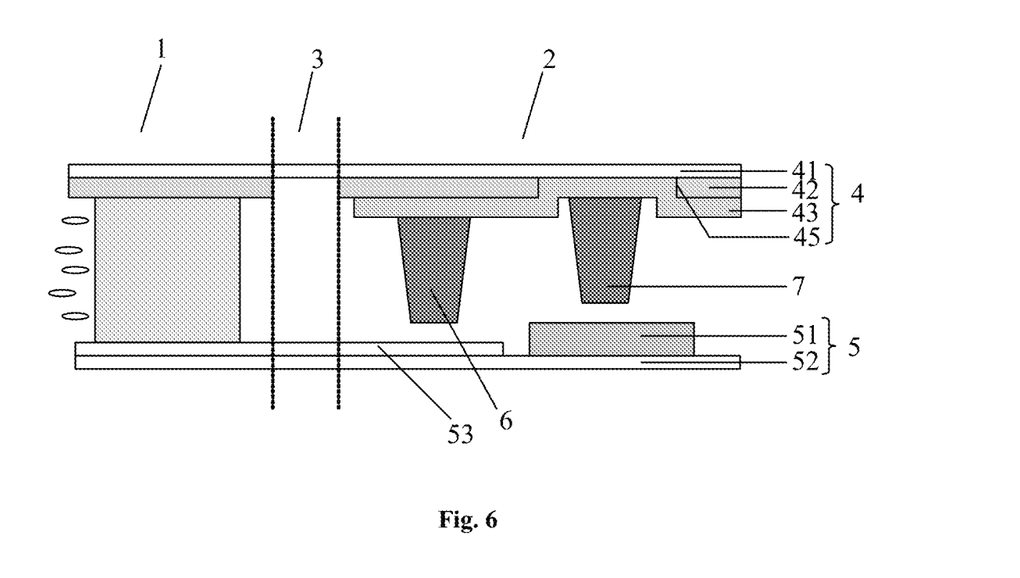
FIG. 6 is still yet another schematic view showing the display panel motherboard according to one embodiment of the present disclosure.

With reference to FIG. 6, the present disclosure further provides in some embodiments a display panel motherboard having a structure similar to that of the above-mentioned display panel board, with a difference in that the first substrate 4 includes the black matrix pattern 42 at a side adjacent to the second substrate 5, the black matrix pattern 42 is provided with a second slot 45, and the second spacer 7 is arranged at a position corresponding to the second slot 45.

It should be appreciated that, in the embodiments of the present disclosure, a depth of the second slot 45 is equal to a thickness of the black matrix pattern 42. To be specific, the first substrate 4 may include the black matrix pattern 42 with the second slot 45 as well as the color resin pattern 43 at the side adjacent to the second substrate 5 (i.e., below the first base substrate 41 in FIG. 6). The second spacer 7 may be arranged at a position corresponding to the second slot 45, i.e., a portion of the second spacer 7 may be arranged in the first substrate 4, and the other portion of the second spacer 7 may be arranged between the first substrate 4 and the second substrate 5.

In a possible embodiment of the present disclosure, the height of the first spacer 6 is identical to the height of the second spacer 7.

To be specific, in the case that the second spacer 7 is arranged at a position corresponding to the second slot 45, actually the second spacer 7 is moved upward. Hence, even in the case that the height of the first spacer 6 is identical to the height of the second spacer 7, there may still exist the vertical distance d2 between the end surface of the second spacer 7 adjacent to the second substrate 5 and the upper surface of the second substrate. At this time, neither of the first spacer 6 and the second spacer 7 is in contact with the second substrate 5, i.e., after the first substrate 4 is arranged opposite to the second substrate 5 to form the cell, neither of the first spacer 6 and the second spacer 7 may function as a support. Hence, in the case of cutting the display panel motherboard to form the display panel, the pressure applied to the portion of the first substrate 4 at the position corresponding to the first spacer 6 may be identical to the pressure applied to the portion of the first substrate 4 at the position corresponding to the second spacer 7, i.e., an even force is applied to the first substrate 4. As a result, it is able to prevent the occurrence of severe cracks.

It should be appreciated that, in the case that the second spacer 7 is moved upward by a distance equal to the vertical distance d1 between the end surface of the first spacer 6 adjacent to the second substrate 5 and the surface of the second substrate 5 adjacent to the first substrate 4, the vertical distance d1 between the end surface of the first spacer 6 adjacent to the second substrate 5 and the surface of the second substrate 5 adjacent to the first substrate 4 is equal to the vertical distance d2 between the end surface of the second spacer 7 adjacent to the second substrate 5 and the surface of the second substrate 5 adjacent to the first substrate 4.

Obviously, the display panel motherboard may be provided in various forms. For example, the depth of the second slot 45 may be smaller than the thickness of the black matrix pattern 42.

According to the display panel motherboard in the embodiments of the present disclosure, the first spacer 6 and the second spacer 7 are arranged sequentially on the first substrate 4 in the direction away from the display region 2. The vertical distance d1 between the end surface of the first spacer 6 adjacent to the second substrate 5 and the surface of the second substrate 5 adjacent to the first substrate 4 is equal to the vertical distance d2 between the end surface of the second spacer 7 adjacent to the second substrate 5 and the surface of the second substrate 5 adjacent to the first substrate 4, so that the pressure applied to the portion of the first substrate 4 at the position corresponding to the first spacer 6 is identical to the pressured applied to the portion of the first substrate 4 at the position corresponding to the second spacer 7 in the case of cutting the display panel motherboard to form the display panel, i.e., an even force is applied to the first substrate 4. In this way, even in the case that a larger pressure is applied, it is still able for the first spacer and the second spacer to provide even and stable support, thereby to prevent the occurrence of severe cracks, reduce the quantity of debris, and prevent the occurrence of defective lines. In addition, it is also able to ensure the detection accuracy and prevent the occurrence of undetected errors.

Figure 7:
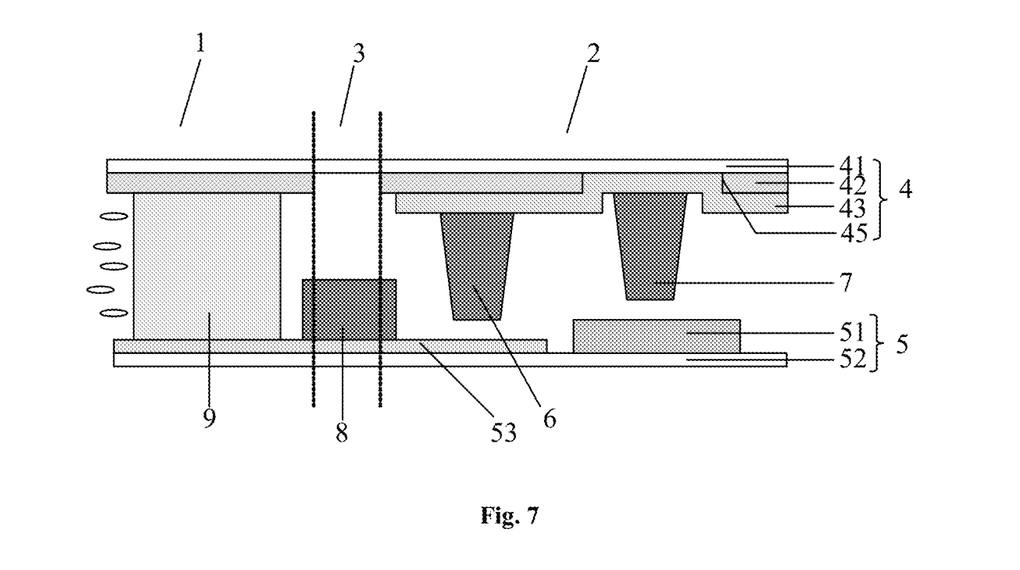
FIG. 7 is still yet another schematic view showing the display panel motherboard according to one embodiment of the present disclosure.

With reference to FIG. 7, the present disclosure further provides in some embodiments a display panel motherboard having a structure similar to that of the above-mentioned display panel motherboard, with a difference in that the cutting region 3 is arranged between the display region 1 and the non-display region 2, and a protection pattern 8 is arranged on the second substrate 5 at a position corresponding to the cutting region 3 of the first substrate 4.

In the related art, in the case of performing the cutting operation at the cutting region 3, the resultant debris may be dropped onto the second substrate 5 (< in FIG. 2). Subsequently, in the case of removing the non-display region 2 of the first substrate 4, a data line or gate line on the second substrate 5 at a position corresponding to the cutting region 3 may be scratched by the debris due to an external force, and thereby the defective line may occur.

According to the display panel motherboard in the embodiments of the present disclosure, through the protection pattern 8 on the second substrate 5 at the position corresponding to the cutting region 3 of the first substrate 4, it is able to protect a portion of the second substrate 5 at a position corresponding to the cutting region 3 of the first substrate 4. Even in the case that the debris occurs during the cutting operation, it may not be dropped onto the portion of the second substrate 5 at the position corresponding to the cutting region 3 of the first substrate 4. As a result, it is able to prevent the data line and gate line on the second substrate 5 at the position corresponding to the cutting region 3 from being scratched by the debris, thereby to improve the cutting quality.

In a possible embodiment of the present disclosure, the protection pattern 8 includes at least one of a first sealant, a conductive layer, an alignment layer and a spacer.

In the case that the protection pattern 8 is formed by the conductive layer made of a metal material, it is able to provide excellent resistance to scratching. In the case that the protection pattern 8 is formed by the spacer, it is able to conveniently adjust a thickness of the spacer through a half-tone mask. In the case that the protection pattern 8 is formed by the alignment layer made of an organic material, it is able for the alignment layer to provide a cushion effect as compared with an inorganic material, e.g., polyvinyl chloride (PVC), although the alignment layer is of a small thickness.

It should be appreciated that, it is unnecessary to individually provide the protection pattern 8, and instead, it may be formed together with a layer made of an identical material at the display region through a single patterning process, i.e., it is unnecessary to provide any additional manufacture process.

In a possible embodiment of the present disclosure, a second sealant 9 is arranged at the display region. In the case that the protection pattern 8 includes the first sealant, a thickness of the first sealant is smaller than a thickness of the second sealant 9. It should be appreciated that, the second sealant 9 is used for sealing the cell. Through the second sealant, it is able to prevent the occurrence of any other defects due to the additional first sealant.

In a possible embodiment of the present disclosure, in the case that the protection pattern 8 includes the conductive layer, the conductive layer is made of ITO. Of course, a material of the conductive layer may not be limited thereto, and it may be selected according to the practical need, which will not be particularly defined herein. In the case that the protection pattern 8 includes the conductive layer, the conductive layer may be formed together with a structure at the display region, e.g., a pixel electrode, through a single patterning process, which will not be particularly defined herein.

According to the display panel motherboard in the embodiments of the present disclosure, through the protection pattern 8 arranged on the second substrate 5 at the position corresponding to the cutting region 3 of the first substrate 4, it is able to protect the portion of the second substrate 5 at the position corresponding to the cutting region 3 of the first substrate 4. Even in the case that the debris occurs during the cutting operation, it may not be dropped onto the portion of the second substrate 5 at the position corresponding to the cutting region 3 of the first substrate 4. As a result, it is able to prevent the data line and gate line on the second substrate 5 at the position corresponding to the cutting region 3 from being scratched by the debris, thereby to improve the cutting quality.

The present disclosure further provides in some embodiments a method for manufacturing the display panel, which includes the following steps.

Step S1: forming the display panel motherboard.

The display panel motherboard includes the first substrate 4 and the second substrate 5 arranged opposite to each other to form a cell. The display region 1 and the non-display region 2 surrounding the display region 1 are provided at the first substrate 4 and the second substrate 5. At the non-display region 2 of the first substrate 4, the first spacer 6 and the second spacer 7 are arranged sequentially on the first substrate 4 in a direction away from the display region 2.

Step S2: cutting the display panel motherboard so as to from the display panel.

Step S1 includes the following steps.

Step S11: forming the first substrate 1.

Step S11 includes: depositing a black matrix material onto the first base substrate 41, and forming the black matrix pattern 42 through exposing, developing and etching; depositing a color resin material onto the black matrix pattern 42, and forming the color resin pattern 43 through exposing, developing and etching; and forming the first spacer 6 and the second spacer 7 sequentially on the color resin pattern 43 in a direction away from the display region 2. The vertical distance d1 between the end surface of the first spacer 6 adjacent to the second substrate 5 and the surface of the second substrate 5 adjacent to the first substrate 4 is equal to the vertical distance d2 between the end surface of the second spacer 7 adjacent to the second substrate 5 and the surface of the second substrate 5 adjacent to the first substrate 4, and the height of the first spacer 6 is greater than the height of the second spacer 7.

Step S12: forming the second substrate 2. To be specific, a switch 51 and an active circuit 53 are formed on a second base substrate 52. This step is known in the art, and thus will not be particularly defined herein.

Step S13: enabling the first substrate 1 to be arranged opposite to the second substrate 2 to form the display panel motherboard.

In a possible embodiment of the present disclosure, Step S1 includes the following steps.

Step S11: forming the first substrate 1.

Step S11 includes: depositing a black matrix material onto the first base substrate 41, and forming the black matrix pattern 42 through exposing, developing and etching; depositing a color resin material onto the black matrix pattern 42, and forming the color resin pattern 43 comprising the first slot 44 through exposing, developing and etching; and forming the first spacer 6 on the color resin pattern 43 at a position adjacent to the display region 1, and forming the second spacer 7 in the first slot 44, so as to from the first substrate 1.

Step S12: forming the second substrate 2. To be specific, the switch 51 and the active circuit 53 are formed on the second base substrate 52. This step is known in the art, and thus will not be particularly defined herein.

Step S13: enabling the first substrate 1 to be arranged opposite to the second substrate 2 to form the display panel motherboard.

In a possible embodiment of the present disclosure, Step S1 includes the following steps.

Step S11: forming the first substrate 1.

Step S11 includes depositing a black matrix material onto the first base substrate 41, and forming the black matrix pattern 42 comprising the second slot 45 through exposing, developing and etching; depositing a color resin material onto the black matrix pattern 42, and forming the color resin pattern 43 through exposing, developing and etching; and forming the first spacer 6 on the color resin pattern 43 at a position adjacent to the display region 1, and forming the second spacer 7 at a position corresponding to the second slot 45, so as to from the first substrate 1.

Step S12: forming the second substrate 2. To be specific, the switch 51 and the active circuit 53 are formed on the second base substrate 52. This step is known in the art, and thus will not be particularly defined herein.

Step S13: enabling the first substrate 1 to be arranged opposite to the second substrate 2 to form the display panel motherboard.

According to the method in the embodiments of the present disclosure, the pressure applied to the portion of the first substrate at the position corresponding to the first spacer is identical to the pressured applied to the portion of the first substrate at the position corresponding to the second spacer in the case of cutting the display panel motherboard to form the display panel. In this way, even in the case that a larger pressure is applied, it is still able for the first spacer and the second spacer to provide even and stable support, thereby to prevent the occurrence of severe cracks, reduce the quantity of debris, and prevent the occurrence of defective lines. In addition, it is also able to ensure the detection accuracy and prevent the occurrence of undetected errors.

The present disclosure further provides in some embodiments a display device including the display panel manufactured from the above-mentioned display panel motherboard. The display device may be any product or member having a display function, such as a liquid crystal display panel, an electronic paper, a mobile phone, a flat-panel computer, a television, a display, a laptop computer, a digital photo frame or a navigator.

According to the display device in the embodiments of the present disclosure, the first spacer 6 and the second spacer 7 are arranged sequentially on the first substrate 4 in the direction away from the display region 2. The vertical distance d1 between the end surface of the first spacer 6 adjacent to the second substrate 5 and the surface of the second substrate 5 adjacent to the first substrate 4 is equal to the vertical distance d2 between the end surface of the second spacer 7 adjacent to the second substrate 5 and the surface of the second substrate 5 adjacent to the first substrate 4, so that the pressure applied to the portion of the first substrate 4 at the position corresponding to the first spacer 6 is identical to the pressured applied to the portion of the first substrate 4 at the position corresponding to the second spacer 7 in the case of cutting the display panel motherboard to form the display panel, i.e., an even force is applied to the first substrate 4. In this way, even in the case that a larger pressure is applied, it is still able for the first spacer and the second spacer to provide even and stable support, thereby to prevent the occurrence of severe cracks, reduce the quantity of debris, and prevent the occurrence of defective lines. In addition, it is also able to ensure the detection accuracy and prevent the occurrence of undetected errors.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display panel motherboard, comprising a first substrate and a second substrate arranged opposite to each other to form a cell, wherein a display region and a non-display region surrounding the display region are provided at the first substrate and the second substrate;
   at the non-display region of the first substrate, a first spacer and a second spacer are arranged sequentially in a direction away from the display region of the first substrate; and
   a vertical distance d1 between an end surface of the first spacer adjacent to the second substrate and a surface of the second substrate adjacent to the first substrate is equal to a vertical distance d2 between an end surface of the second spacer adjacent to the second substrate and the surface of the second substrate adjacent to the first substrate;
   wherein a cutting region is arranged between the display region and the non-display region, and the second substrate is provided with a protection pattern at a position corresponding to the cutting region of the first substrate.

2. The display panel motherboard according to claim 1, wherein each of d1 and d2 is greater than zero.

3. The display panel motherboard according to claim 1, wherein each of d1 and d2 is equal to zero.

4. The display panel motherboard according to claim 1, wherein a height of the first spacer is greater than a height of the second spacer.

5. The display panel motherboard according to claim 1, wherein the first substrate comprises a color resin pattern at a side adjacent to the second substrate, and the color resin pattern is provided with a first slot in which a portion of the second spacer is located.

6. The display panel motherboard according to claim 5, wherein a height of the first spacer is equal to a height of the second spacer.

7. The display panel motherboard according to claim 1, wherein the first substrate comprises a black matrix pattern at a side adjacent to the second substrate, and the black matrix pattern is provided with a second slot at a position corresponding to the second spacer.

8. The display panel motherboard according to claim 7, wherein a height of the first spacer is equal to a height of the second spacer.

9. The display panel motherboard according to claim 1, wherein the protection pattern comprises at least one of a first sealant, a conductive layer, an alignment layer, or a spacer.

10. The display panel motherboard according to claim 9, wherein a second sealant for sealing the cell is provided at the display region, and in the case that the protection pattern comprises the first sealant, a thickness of the first sealant is smaller than or equal to a thickness of the second sealant.

11. The display panel motherboard according to claim 9, wherein in the case that the protection pattern comprises the conductive layer, the conductive layer is made of indium tin oxide (ITO).

12. A method for manufacturing a display panel, the method comprising:
   forming a display panel motherboard; and
   cutting the display panel motherboard to form the display panel;
   wherein the display panel motherboard comprises a first substrate and a second substrate arranged opposite to each other to form a cell, wherein a display region and a non-display region surrounding the display region are provided at the first substrate and the second substrate;
   at the non-display region of the first substrate, a first spacer and a second spacer are arranged sequentially in a direction away from the display region of the first substrate; and
   a vertical distance d1 between an end surface of the first spacer adjacent to the second substrate and a surface of the second substrate adjacent to the first substrate is equal to a vertical distance d2 between an end surface of the second spacer adjacent to the second substrate and the surface of the second substrate adjacent to the first substrate;
   wherein a cutting region is arranged between the display region and the non-display region, and the second substrate is provided with a protection pattern at a position corresponding to the cutting region of the first substrate.

13. The method according to claim 12, wherein the step of forming the display panel motherboard comprises: forming the first substrate; forming the second substrate; enabling the first substrate to be arranged opposite to the second substrate to form the cell to form the display panel motherboard; and
   the step of forming the first substrate comprises: depositing a black matrix material onto a first base substrate, and forming a black matrix pattern through exposing, developing and etching; depositing a color resin material onto the black matrix pattern, and forming a color resin pattern through exposing, developing and etching; and forming the first spacer and the second spacer sequentially on the color resin pattern in a direction away from the display region;
   wherein a height of the first spacer is greater than a height of the second spacer.

14. The method according to claim 12, wherein the step of forming the display panel motherboard comprises: forming the first substrate; forming the second substrate; and enabling the first substrate to be arranged opposite to the second substrate to form the cell to form the display panel motherboard, and
   the step of forming the first substrate comprises: depositing a black matrix material onto a first base substrate, and forming a black matrix pattern through exposing, developing and etching; depositing a color resin material onto the black matrix pattern, and forming a color resin pattern comprising a first slot through exposing, developing and etching; and forming the first spacer on the color resin pattern at a position adjacent to the display region, and forming the second spacer in the first slot to form the first substrate.

15. The method according to claim 12, wherein the step of forming the display panel motherboard comprises: forming the first substrate; forming the second substrate; and enabling the first substrate to be arranged opposite to the second substrate to form the cell to form the display panel motherboard, and the step of forming the first substrate comprises: depositing a black matrix material onto a first base substrate, and forming a black matrix pattern comprising a second slot through exposing, developing and etching; depositing a color resin material onto the black matrix pattern, and forming a color resin pattern through exposing, developing and etching; and forming the first spacer on the color resin pattern at a position adjacent to the display region, and forming the second spacer at a position corresponding to the second slot to form the first substrate.

* * * * *